ically excited to cause the reaction, $COCl_2 \rightarrow CO + Cl_2$. Also there may be other mechanism or species formed to cause destruction of the $COCl_2$. By flowing the mixture through the discharge, the mixture can be continually cleaned to provide a source of highly pure $BCl_3$ for use. A typical electrical power source used to provide the electrical discharge is a conventional neon sign transformer with an input voltage of $110$ V a-c and an output of about $15,000$ V a-c.

United States Patent [19]
Meyer et al.

[11] 4,204,926
[45] May 27, 1980

[54] METHOD FOR THE REMOVAL OF PHOSGENE IMPURITIES FROM BORON TRICHLORIDE

[75] Inventors: Harry C. Meyer; George A. Tanton, both of Huntsville, Ala.; Raymond I. Greenberg, Andover, Mass.; Joe E. Williams, Huntsville, Ala.

[73] Assignee: The United States of America as represented by the Secretary of the Army, Washington, D.C.

[21] Appl. No.: 21,037

[22] Filed: Mar. 16, 1979

[51] Int. Cl.² ............... B01J 1/10; B01K 1/00; C01B 35/06
[52] U.S. Cl. ................... 204/157.1 H; 204/164; 204/165
[58] Field of Search ............... 204/164, 165, 157.1 H

[56] References Cited
U.S. PATENT DOCUMENTS

| | | | |
|---|---|---|---|
| 3,485,735 | 12/1969 | Manion et al. | 204/169 |
| 4,063,896 | 12/1977 | Merritt et al. | 23/254 R |
| 4,104,146 | 8/1978 | Sudduth et al. | 204/165 |

OTHER PUBLICATIONS

Tech. Report, TR-77-7 by Tanton et al., pp. 1-10, U.S. Army Missile R. & D. Command, Redstone Arsenal, 4/77.

*Primary Examiner*—F. C. Edmundson
*Attorney, Agent, or Firm*—Nathan Edelberg; Robert P. Gibson; Jack W. Voigt

[57] ABSTRACT

Phosgene, $COCl_2$, an impurity in $BCl_3$ is removed by exposing a $BCl_3$ mixture containing the impurity to an electrical discharge (i.e., electrical excitation energy level) directed through the mixture. The $BCl_3$ gas with $COCl_2$ impurity can be flowing or stationary as desired for a particular process.

5 Claims, No Drawings

METHOD FOR THE REMOVAL OF PHOSGENE IMPURITIES FROM BORON TRICHLORIDE

DEDICATORY CLAUSE

The invention described herein may be manufactured, used, and licensed by or for the Government for governmental purposes without the payment to us of any royalties thereon.

BACKGROUND OF THE INVENTION

Commerical processes for producing $BCl_3$ (boron trichloride) result also in the production of the impurity $COCl_2$ (phosgene). The removal of $COCl_2$ has been a problem, particularly where it is desired not to introduce other contaminants in the $BCl_3$ either by the process directly or indirectly. $COCl_2$ causes difficulties when $BCl_3$ is used in the electronics industry in the manufactured of electrical components, when $BCl_3$ is used as a catalyst in numerous ways such as in the production of styrene, when $BCl_3$ is used as an additive for high energy fuels, or when $BCl_3$ is used in the refining of various refractory metals, etc. In the past, removal of the impurity from $BCl_3$ by economical methods has proven unsuccessful.

More recently, U.S. Pat. No. 4,063,896 issued to James A. Merritt and Lawrence C. Robertson on Dec. 20, 1977 and assigned to The United States of America as represented by the Secretary of the Army, discloses a method wherein phosgene as an impurity in $BCl_3$ is dissociated by $CO_2$ laser radiation. In this method the power level of a cw $CO_2$ multiline laser can be varied to accomplish the irradiation to effectively dissociate the $COCl_2$ into its dissociation products, substantially $CO$ and $Cl_2$. The $BCl_3, \nu_3$ (956 cm$^{-1}$) fundamental is resonant with $CO_2$ ($P_{20}$) laser line and strongly absorbs this energy which is followed by an intramolecular V-V transfer of energy to the $COCl_2$ which results in its dissociation. The gaseous compound $C_2H_4$ having combination bands and overtones that match reasonably close to the energy levels of $COCl_2$ can also serve as a diluent for $COCl_2$ to effect transfer of energy for dissociation of $COCl_2$ by cw $CO_2$ laser radiation.

Although the aforementioned method for removing $COCl_2$ from $BCl_3$ by laser is a meritorious achievement, the method has the limitation of requiring a laser source.

Therefore, an object of this invention is to provide a method which does not require a laser for purifying $BCl_3$ of the impurity $COCl_2$.

Another object of this invention is to provide a method for purifying $BCl_3$ of the impurity $COCl_2$ by an electric excitation selected from electrical discharge excitations, radio frequency excitation, or electron beam excitation.

SUMMARY OF THE INVENTION

A mixture of c.p. grade $BCl_3$ which is contaminated with 0.1% $COCl_2$ is introduced into a cell fitted with IR windows on each end of the cell for observation and monitoring purposes. This cell (e.g. glass) is provided with a pair of tungsten electrodes for maintaining an electrical discharge. The electrodes which can be positioned on either side of the glass cell are connected to either a high power (current and/or voltage) supply or an r.f. (radio frequency) source such as achieved from Tesla coils for maintaining a discharge through the mixture. Also, electron beam excitation of the gas mixture can be employed in the method of this invention.

After one minute of discharge through the $BCl_3$ contaminated with $COCl_2$, all of the $COCl_2$ was removed as evidenced by no $COCl_2$ detectable by a FTS-20B spectrometer. The pressure of $BCl_3$ was at about 100 torr. The pressure of $BCl_3$ can be varied since the electrical excitation energy level can be varied by adjustment of the power level as well as the number of electrodes as required for the system employed.

DESCRIPTION OF THE PREFERRED EMBODIMENT

Purifying of $BCl_3$ contaminated with $COCl_2$ is accomplished by passing an electrical discharge through a mixture of $BCl_3$ and $COCl_2$ in a reaction cell. The $COCl_2$ is readily decomposed to harmless products for end use of $BCl_3$.

Electrodes for maintaining an electrical discharge are positioned on either side of a cell filled with $BCl_3$ gas containing $COCl_2$ as an impurity. The reaction cell is fitted with IR windows for observation and monitoring purposes. The $BCl_3$ gas with $COCl_2$ impurity can be flowing or stationary as desired for the particular process. The electrodes (tungsten) are connected to either a high power (current and/or voltage) supply or an r.f. source such as Tesla coils for maintaining a discharge through the mixture. Electron beam excitation can also be employed to decompose $COCl_2$ impurity.

One experimental set-up included filling the reaction cell with $BCl_3$ and contaminant (about 0.1% $COCl_2$ as is present in c.p. grade $BCl_3$) to about 100 torr pressure. An electrical discharge was passed through the gas mixture for about one minute during which time all of the $COCl_2$ was decomposed without decomposing the $BCl_3$. No $COCl_2$ was detectable with a FTS-20B spectrometer.

Additional evaluations of the method of this invention indicate that purification of boron trichloride ($BCl_3$) containing phosgene ($COCl_2$) impurity is accomplished by delivering an electrical excitation energy level from a means selected from the group of electrical excitation means consisting of:

1. R.F. excitation of $BCl_3 + COCl_2$ to remove $COCl_2$ impurity;
2. Excitation of $BCl_3$ containing the $COCl_2$ impurity by direct current in a resistive medium;
3. Excitation of $BCl_3$ containing the $COCl_2$ impurity by alternating current in a resistive medium; and,
4. Electron beam excitation of $BCl_3$ containing the $COCl_2$ impurity.

The reaction cell can vary in design but generally would be fitted with inlet and outlet means, pressure measuring means, one or more pairs of electrodes as required by method employing direct or alternating current for delivering excitation to gas mixture, windows through which process can be monitored, focusing means, and other commonly employed fixtures and devices as required for batch or continuous processes of operation for the electrical excitation means selected. For example, when employing r.f. excitation energy or electron beam excitation energy, windows transparent to the excitation energy are employed when the excitation source is external to the reaction cell. An alternate embodiment includes the excitation source to be located within the reaction cell as explained in further detail below.

Another experimental set-up included filling a reaction cell, wherein an electron beam source is internally mounted, with gas mixture of $BCl_3$ and contaminant (about 0.1% $COCl_2$ as is present in c.p. grade $BCl_3$) to a predetermined pressure of about 100 torr. The electron beam excitation energy source is activated to cause a discharge of electron beam excitation to be directed through the gas mixture to effect complete decomposition of the $COCl_2$ as determined by monitoring means. The electron beam excitation source can be employed with a flowing system or stationary system of operation by employing conventional adaptations as required.

The term resistive medium as used in this invention means the $BCl_3$ and $COCl_2$ in a diluent gas which may be employed as a carrier medium. The excitation level can be adjusted to the level required to effect decomposition of $COCl_2$ in a flowing or stationary mode of operation. Also, the excitation can be repeated as the need requires as indicated by monitoring of $COCl_2$ to determine when all of the $COCl_2$ has been decomposed.

The purity of $BCl_3$ achieved as a result of purification by the method of this invention employing any of the enumerated means for excitation meets the needs for many end uses for $BCl_3$ such as for catalyst use in the electronics industry in the manufacture of electrical components, for catalyst use in numerous ways such as in the production of styrene, for use in rocket propellant manufacture, and for use in the refining of various refractory metals, etc.

We claim:

1. A method for the removal of phosgene impurities from boron trichloride comprising:
    (i) Admitting a gaseous mixture of $BCl_3$ containing $COCl_2$ as an impurity into a reaction cell to achieve a predetermined pressure in said reaction cell that is operable with the electrical excitation energy level employed to effect decomposition of said $COCl_2$ impurity;
    (ii) delivering an electrical excitation energy level for a predetermined time period through said gaseous mixture to effect decomposition of said $COCl_2$ impurity;
    (iii) monitoring said $COCl_2$ impurity concentration level to determine when all of said $COCl_2$ impurity has been decomposed; and,
    (iv) repeating said step of delivering an electrical excitation energy level when said monitoring step determines that $COCl_2$ impurity is present in said reaction cell.

2. The method of claim 1 wherein said predetermined pressure is about 100 torr and wherein said electrical excitation energy level delivered is a direct current discharge that is delivered through said gaseous mixture for a predetermined time period of about one minute and wherein said monitoring step employs a spectrometer.

3. The method of claim 1 wherein said predetermined pressure is about 100 torr and wherein said electrical excitation energy level delivered is an alternating current discharge that is delivered through said gaseous mixture for a predetermined time period of about one minute and wherein said monitoring step employs a spectrometer.

4. The method of claim 1 wherein said predetermined pressure is about 100 torr and wherein said electrical excitation energy level delivered is a focused radio frequency energy that is delivered through said gaseous mixture for a predetermined time period of about one minute and wherein said monitoring step employs a spectrometer.

5. The method of claim 1 wherein said predetermined pressure is about 100 torr and wherein said electrical excitation energy delivered is a focused electron beam that is delivered through said gaseous mixture for a predetermined time period of about one minute and wherein said monitoring step employs a spectrometer.

* * * * *